United States Patent [19]

Minematsu et al.

[11] 4,361,684
[45] Nov. 30, 1982

[54] PROCESS FOR PREPARING COPOLYMERS COMPRISING α-ALKYL STYRENE AND UNSATURATED NITRILE

[75] Inventors: Hiroyuki Minematsu, Niihama; Kojiro Matsumoto, Takarazuka; Tadashi Saeki; Akira Kishi, both of Niihama, all of Japan

[73] Assignee: Sumitomo Naugatuck Co., Ltd., Osaka, Japan

[21] Appl. No.: 270,879

[22] Filed: Jun. 5, 1981

[30] Foreign Application Priority Data

Jun. 5, 1980 [JP] Japan ................................ 55-76025
May 2, 1981 [JP] Japan ................................ 56-67537

[51] Int. Cl.³ .......................................... C08F 220/44
[52] U.S. Cl. .................................... 526/87; 428/402; 526/293; 526/342
[58] Field of Search ...................... 526/87, 342, 293; 260/29.6 R; 428/402

[56] References Cited

U.S. PATENT DOCUMENTS 4,169,195  9/1979  Rinehart .............................. 526/342
4,200,593  4/1980  van der Loos et al. ............ 526/342

Primary Examiner—Harry Jr. Wong
Attorney, Agent, or Firm—Birch, Stewart, Kolasch & Birch

[57] ABSTRACT

In the emulsion polymerization of an α-alkylstyrene and an unsaturated nitrile copolymerizable therewith in a weight proportion of 70:30 to 80:20 in the presence of a radical initiator, an improved process wherein the monomers are introduced into the reaction system in such a manner that the concentration of the unreacted unsaturated nitrile in the reaction system is not less than 31% by weight to the entire amount of the unreacted monomers in the reaction system at the completion of the introduction of the monomers, whereby a copolymer of the α-alkylstyrene and the unsaturated nitrile having an excellent thermal resistance is produced with marked decrease in the amount of unreacted monomers.

19 Claims, No Drawings

PROCESS FOR PREPARING COPOLYMERS COMPRISING α-ALKYL STYRENE AND UNSATURATED NITRILE

The present invention relates to an improved process for preparing copolymers having an excellent thermal resistance with marked decrease in the amount of unreacted monomers.

At the present time, heat-resistant ABS resins obtained by admixing α-methylstyrene-acrylonitrile copolymers and styrene-acrylonitrile-butadiene graft polymers are widely employed. However, the heat-resistance of such ABS resins is not satisfactory for some purposes, and the appearance of thermoplastic resins having a higher heat-resistance is desired.

The heat-resistance temperature of heat-resistant ABS resins is mainly dependent on the heat-resistance temperature of the α-methylstyrene-acrylonitrile copolymers constituting the matrix, and the heat-resistance temperature of such copolymers is influenced by their α-methylstyrene content. Thus, with a larger content of α-methylstyrene, a higher heat-resistance is obtained. However, α-methylstyrene is less reactive in the radical polymerization, and it is difficult to polymerize α-methylstyrene alone, i.e. without copolymerization with acrylonitrile or other monomers. Therefore, in the preparation of α-methylstyrene-unsaturated nitrile copolymers containing a higher content of α-methylstyrene, the amount of α-methylstyrene to be used is naturally restricted for decreasing the concentration of unreacted monomers to less than 1% by weight (to the entire amount of the monomers charged) at completion of the polymerization.

In usual α-methylstyrene-acrylonitrile copolymers, the content of α-methylstyrene is about 70% by weight at the highest, and the heat-resistance temperature of the heat-resistant ABS resin containing such a copolymer is about 105° C. at the highest. In conventional preparation procedures for obtaining a copolymer containing 70% by weight of α-methylstyrene, the concentration of unreacted monomers at completion of the polymerization is usually 1% by weight or more. For decreasing the amount of unreacted monomers to less than 1% by weight, the amount of α-methylstyrene must be decreased, whereby the heat-resistance of the copolymer and consequently the heat-resistance of the ABS resin are unfavorably reduced. Application of stripping to the produced latex makes it possible to maintain the α-methylstyrene content above 70% by weight and the unreacted monomer content below 1% by weight. However, such stripping requires a long time and results in remarkable deterioration of the yield. Further, α-methylstyrene-acrylonitrile copolymers show, with a larger content of α-methylstyrene, a higher thermal decomposability on heating, for instance, on processing such as molding.

As a result of the extensive study for overcoming the above mentioned drawbacks in conventional techniques, it has now been found that a heat-resistant copolymer containing 70–80% by weight of α-alkylstyrene and showing a low thermal decomposability on heating can be prepared with marked prevention of formation of coagulated products in the polymer latex and with notable decrease of the amount of unreacted monomers when the addition of monomers to the reaction system is effected in a certain special manner and the polymerization is effected in such manner as affording a copolymer latex including particles of a specifically defined size.

According to the present invention, there is provided a process for emulsion polymerization of an α-alkylstyrene and an unsaturated nitrile copolymerizable therewith in a weight proportion of 70:30 to 80:20 in the presence of a radical initiator, an improved process wherein the monomers are introduced into the reaction system in such a manner that the concentration of the unsaturated nitrile as unreacted in the reaction system is not less than 31% by weight to the entire amount of the monomers as unreacted in the reaction system at the completion of the introduction of the monomers, whereby the copolymer of the α-alkylstyrene and the unsaturated nitrile having an excellent thermal resistance is produced with marked decrease of the monomers as unreacted. The above process is particularly effective when the polymerization is effected in such a manner that not less than 90% of the particles of the produced copolymer latex have a particle size of not more than 0.10μ.

Thus, the process of the invention, can produce a copolymer containing a high concentration of α-alkylstyrene and showing a high thermal resistance with marked prevention of formation of coagulated products in the copolymer latex and with notable decrease of the amount of unreacted monomers. Since no stripping treatment is required, the process realizes a high producibility and is extremely advantageous in industry.

The present invention is explained in detail in the following description.

The α-alkylstyrene to be used in the invention is a compound represented by the formula:

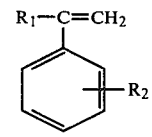

wherein $R_1$ is a $C_1$–$C_3$ alkyl group and $R_2$ is a hydrogen atom, a $C_1$–$C_3$ alkyl group or a halogenated $C_1$–$C_3$ alkyl group. Examples of such compound are α-methylstyrene, α-ethylstyrene, methyl-α-methylstyrene, etc. Among them, α-methylstyrene is the most preferable.

As the unsaturated nitrile, acrylonitrile, methacrylonitrile, ethacrylonitrile, etc. are exemplified. Among them, acrylonitrile is the most preferable.

As the radical initiator, there may be employed potassium persulfate, sodium persulfate, ammonium persulfate, cumene hydroperoxide, diisopropylbenzene hydroperoxide, etc. Among them, potassium persulfate and sodium persulfate are preferable.

As the emulsifier to be used in the emulsion polymerization, a conventional emulsifier may be employed. Particularly preferred is an anionic one such as sodium laurylsulfate, potassium oleate, sodium oleate, potassium or sodium salt of a fatty acid, potassium or sodium salt of rhodinic acid or sodium alkylbenzenesulfonate.

In the present invention, the α-alkylstyrene and the unsaturated nitrile are subjected to emulsion polymerization in a weight proportion of 70:30 to 80:20. When the amount of the α-alkylstyrene is less than the lower limit, the thermal resistance of the obtained copolymer is greatly reduced. When the amount exceeds the higher limit, it is difficult to decrease the amount of unreacted monomers to 1% by weight or less at completion of the polymerization.

In the present invention, it is required to effect the addition of the monomers to the reaction system in such a manner that the concentration of the unsaturated nitrile as unreacted in the reaction system at completion of the addition of the monomers is 31% by weight or more (based on the entire amount of the monomers unreacted in the reaction system at completion of the addition of the monomers). When the concentration of the unreacted unsaturated nitrile in the reaction system is less than 31% by weight at completion of the addition of the monomers, it is difficult to decrease the amount of the unreacted monomers to 1% by weight or less at completion of the polymerization. Besides, the productivity is lowered.

For addition of the monomers so as to keep the concentration of the unreacted unsaturated nitrile in the reaction system to 31% by weight or more, the following procedures may be adopted: regulation of the rate of addition of each of the $\alpha$-alkylstyrene and the unsaturated nitrile while measuring the concentration of the unreacted unsaturated nitrile in the reaction system; regulation of the mixing proportion of the $\alpha$-alkylstyrene and the unsaturated nitrile in their mixture; addition of the entire amount of the $\alpha$-alkylstyrene and regulation of the rate of addition of the unsaturated nitrile, etc.

Preferably, the polymerization is effected in such a manner that 90% by weight or more of the particles of the copolymer latex have a particle size of $0.10\mu$ or less. The term "particle size" herein used means the particle size of the copolymer latex at completion of the polymerization. When the particle size is larger than $0.10\mu$, the thermal decomposability of the obtained copolymer on heating, for instance, at processing such as molding is greatly increased. Besides, the polymerization rate is decreased with formation of coagulated products in the copolymer latex and with increase of the amount of the unreacted monomers. For keeping the particle size of 90% or more of the particles of the copolymer latex at $0.10\mu$ or less, the amount of deionized water to be used in the polymerization may be increased, or alternatively, the amount of the emulsifier may be increased.

The addition of the $\alpha$-alkylstyrene and the unsaturated nitrile to the reaction system may be effected continuously or portionwise without any particular limitation. If necessary, a polymerization degree-regulating agent or any other additive may be employed.

The copolymer of the invention can be blended with conventional styrene-acrylonitrile-butadiene graft polymers, and the thus obtained resin composition possesses a superior thermal resistance in comparison with usual thermal resistant ABS resins containing $\alpha$-methylstyrene-acrylonitrile copolymers obtained by conventional procedures.

The present invention will be hereinafter explained further in detail by the following Examples which are not intended to limit the scope of the invention. In these Examples, part(s) and % are by weight, unless otherwise indicated. For determination of the glass transition temperature and the thermal decomposition temperature on 50% weight decrease, the copolymer latex was subjected to salting-out by adding into a 3% aqueous magnesium sulfate solution. The precipitated copolymer was collected, dried and subjected to determination.

EXAMPLE 1

Into a reaction vessel wherein the atmosphere was replaced by nitrogen, deionized water (140 parts), sodium laurylsulfate (3 parts), potassium persulfate (0.7 part) and n-dodecylmercaptan (0.1 part) were charged, and the temperature was elevated up to 70° C. A mixture of $\alpha$-methylstyrene (75 parts) and acrylonitrile (5 parts) was added thereto continuously in 6 hours. With regulation of the concentration of the unreacted acrylonitrile, $\alpha$-methylstyrene (3 parts) and acrylonitrile (17 parts) were added thereto in 2 hours. The concentration of the unreacted acrylonitrile in the reaction system at completion of the addition of the monomers was 33%. Then, the polymerization was further continued for 2 hours. The concentrations of the unreacted $\alpha$-methylstyrene and of the unreacted acrylonitrile in the reaction mixture at completion of the polymerization were respectively 0.68% and 0.21% to the entire amount of the used monomers.

EXAMPLE 2

Into a reaction vessel wherein the atmosphere was replaced by nitrogen, deionized water (140 parts), sodium laurylsulfate (3 parts), potassium persulfate (0.7 part) and n-dodecylmercaptan (0.1 part) were charged, and 20% of a mixture of $\alpha$-methylstyrene (69 parts) and acrylonitrile (20 parts) was added thereto. The temperature was elevated up to 70° C. After the initiation of the polymerization, 80% of the said monomer mixture was continuously added to the reaction system in 5 hours. With regulation of the concentration of the unreacted acrylonitrile, $\alpha$-methylstyrene (2 parts) and acrylonitrile (9 parts) were added thereto in 2 hours. The concentration of the unreacted acrylonitrile in the reaction system at completion of the addition of the monomers was 51%. Then, the polymerization was further continued for 2 hours. The concentrations of the unreacted $\alpha$-methylstyrene and of the unreacted acrylonitrile in the reaction mixture at completion of the polymerization were respectively 0.38% and 0.20% to the entire amount of the used monomers.

EXAMPLE 3

Into a reaction vessel wherein the atmosphere was replaced by nitrogen, deionized water (140 parts), sodium laurylsulfate (3 parts), potassium persulfate (0.7 part) and n-dodecylmercaptan (0.1 part) were charged, and $\alpha$-methylstyrene (74 parts) was added thereto. The temperature was elevated up to 70° C. Acrylonitrile (26 parts) was added thereto continuously in 8 hours. After 4 hours from the initiation of the addition of acrylonitrile, the concentration of the unreacted acrylonitrile in the reaction system was measured. The concentration of the unreacted acrylonitrile in the reaction system at completion of the addition of the monomers was 45%. Then, the polymerization was further continued for 2 hours. The concentrations of the unreacted $\alpha$-methylstyrene and of the unreacted acrylonitrile in the reaction mixture at completion of the polymerization were respectively 0.60% and 0.30% to the entire amount of the used monomers.

COMPARATIVE EXAMPLE 1

Into a reaction vessel wherein the atmosphere was replaced by nitrogen, deionized water (140 parts), sodium laurylsulfate (3 parts), potassium persulfate (0.7 part) and n-dodecylmercaptan (0.1 part) were charged, and the temperature was elevated up to 70° C. A mixture of α-methylstyrene (78 parts) and acrylonitrile (22 parts) was added thereto continuously in 8 hours. The concentration of the unreacted acrylonitrile in the reaction system at completion of the addition of the monomers was 15%. After completion of the addition of the monomers, the polymerization was further continued for 2 hours. The concentrations of the unreacted α-methylstyrene and of the unreacted acrylonitrile in the reaction mixture at completion of the polymerization were respectively 8.1% and 0.07% to the entire amount of the used monomers.

COMPARATIVE EXAMPLE 2

Into a reaction vessel wherein the atmosphere was replaced by nitrogen, deionized water (140 parts), sodium laurylsulfate (3 parts), potassium persulfate (0.7 part) and n-dodecylmercaptan (0.1 part) were charged, and 20% of a mixture of α-methylstyrene (70 parts) and acrylonitrile (8 parts) was added thereto. The temperature was elevated up to 70° C. After the initiation of the polymerization, the remaining 80% of the said monomer mixture was continuously added to the reaction system in 5 hours. Without regulation of the concentration of the unreacted acrylonitrile, α-methylstyrene (8 parts) and acrylonitrile (14 parts) were added in lump thereto. The concentration of the unreacted acrylonitrile in the reaction system at completion of the addition of the monomers was 21%. Then, the polymerization was further continued for 4 hours. The concentrations of the unreacted α-methylstyrene and of the unreacted acrylonitrile in the reaction mixture at completion of the polymerization were respectively 4.2% and 0.11% to the entire amount of the used monomers.

EXAMPLE 4

Into a reaction vessel wherein the atmosphere was replaced by nitrogen, deionized water (180 parts), sodium laurylsulfate (3 parts), potassium persulfate (0.7 part) and n-dodecylmercaptan (0.1 part) were charged, and the temperature was elevated up to 70° C. 50% of a mixture comprising α-methylstyrene (75 parts) and acrylonitrile (10 parts) was added thereto, and polymerization was carried out for 2 hours. Then, the remaining 50% of the said monomer mixture was added continuously in 3 hours. With regulation of the concentration of the unreacted acrylonitrile, α-methylstyrene (3 parts) and acrylonitrile (12 parts) were added thereto in 2 hours. The concentration of the unreacted acrylonitrile in the reaction system at completion of the addition of the monomers was 35%. Then, the polymerization was further continued for 2 hours.

The results were as follows:

| | |
|---|---|
| Unreacted α-methylstyrene*[1]: | 0.59% |
| Unreacted acrylonitrile*[1]: | 0.19% |
| Coagulated products in: copolymer latex | 0.002% |
| Average particle size*[2]: of copolymer latex | 0.08μ |
| Softening point of*[3]: copolymer | 135° C. |
| Thermal decomposition*[3]: temperature on 50% weight decrease | 379° C. |

Note:
*[1]Determination of the unreacted monomer in the copolymer latex was effected by gas chromatography. The concentration of the unreacted monomer was indicated by % based on the amount of the monomer charged.
*[2]Determination of the particle size of the copolymer latex after completion of the polymerization was effected by the aid of an electron microscope of HS-8 type manufactured by Hitachi, Ltd.
*[3]Determination of the glass transition temperature of the copolymer and the thermal decomposition temperature on 50% weight decrease was effected by the aid of TG-DSC (differential calorimetric balance) manufactured by Rigaku Denki K.K. In determination of the glass transition temperature, copolymer powder was used, and the temperature elevation rate of 10° C./min was adopted. For determination of the thermal decomposition temperature on 50% weight decrease, disk-like tablets were prepared from the powder of the copolymer at room temperature under a pressure of 500 kg/cm², and these tablets were subjected to the determination in the air under a temperature elevation rate of 10° C./min to measure the temperature at which 50% weight decrease based on the initial weight was observed.

EXAMPLE 5

Into a reaction vessel wherein the atmosphere was replaced by nitrogen, deionized water (200 parts), sodium laurylsulfate (3 parts), potassium persulfate (0.7 part) and n-dodecylmercaptan (0.1 part) were charged, and 20% of a mixture of α-methylstyrene (71 parts) and acrylonitrile (20 parts) was added thereto. The temperature was elevated up to 70° C. After 1 hour from the initiation of the polymerization, 80% of the said monomer mixture was continuously added to the reaction system in 4 hours. With regulation of the concentration of the unreacted acrylonitrile, α-methylstyrene (2 parts) and acrylonitrile (7 parts) were added thereto in 2 hours. The concentration of the unreacted acrylonitrile in the reaction system at completion of the addition of the monomers was 43%. Then, the polymerization was further continued for 2 hours.

The results were as follows:

| | |
|---|---|
| Unreacted α-methylstyrene: | 0.29% |
| Unreacted acrylonitrile: | 0.16% |
| Coagulated products in: copolymer latex | 0.002% |
| Average particle size: of copolymer latex | 0.050μ |
| Softening point of: copolymer | 129° C. |
| Thermal decomposition: temperature on 50% weight decrease | 392° C. |

EXAMPLE 6

Into a reaction vessel wherein the atmosphere was replaced by nitrogen, deionized water (200 parts), sodium laurylsulfate (4 parts), potassium persulfate (0.7 part) and n-dodecylmercaptan (0.1 part) were charged, and a mixture of α-methylstyrene (74 parts) and acrylonitrile (8 parts) was added thereto. The temperature was elevated up to 70° C., and polymerization was carried out for 3 hours. With regulation of the concentration of the unreacted acrylonitrile, acrylonitrile (18 parts) was added thereto in 4 hours. The concentration of the unreacted acrylonitrile in the reaction system at completion of the addition of the acrylonitrile was 49%. Then, the polymerization was further continued for 2 hours.

The results were as follows:

| | |
|---|---|
| Unreacted α-methylstyrene: | 0.26% |
| Unreacted acrylonitrile: | 0.22% |

-continued

| | |
|---|---|
| Coagulated products in: copolymer latex | 0.009% |
| Average particle size: of copolymer latex | 0.045μ |
| Softening point of: copolymer | 130° C. |
| Thermal decomposition: temperature on 50% weight decrease | 392° C. |

What is claimed is:

1. A process for the production of a copolymer of an α-alkylstyrene and an unsaturated nitrile, comprising the steps of:
   introducing α-alkylstyrene monomers and unsaturated nitrile monomers in a reaction system in a weight ratio of 70:30 to 80:20, respectively, and copolymerizing said introduced monomers in the presence of a radical initiator in such a manner that the concentration of unreacted unsaturated nitrile in the reaction system is not less than 31% by weight of the entire amount of unreacted monomers in the reaction system at the completion of introducing the monomers into the system; and
   after the completion of introducing the monomers into the reaction system, further polymerizing the monomers to produce a copolymer comprising α-alkylstyrene and unsaturated nitrile monomers in a weight ratio of 70:30 to 80:20, wherein the produced copolymer has excellent thermal resistance and has 1% by weight or less of unreacted monomers at completion of polymerization.

2. The process according to claim 1, wherein polymerization is effected in such a manner that 90% by weight or more of the particles of the produced copolymer have a particle size of 0.10μ or less.

3. The process according to claim 1, wherein said monomers are introduced into said reaction system with regulation of the rate of addition of each of the α-alkylstyrene and the unsaturated nitrile.

4. The process according to claim 1, wherein said monomers are introduced into said reaction system with regulation of the mixing proportion of the α-alkylstyrene and the unsaturated nitrile.

5. The process according to claim 1, wherein said monomers are introduced into said reaction system by addition of the entire amount of the α-alkylstyrene and regulation of the rate of addition of the unsaturated nitrile.

6. The process according to claim 1, wherein during said introducing step a monomer mixture containing a larger proportion of α-alkylstyrene and a smaller proportion of unsaturated nitrile are added to the reaction system and thereafter, with regulation of the concentration of unreacted unsaturated nitrile, a monomer mixture containing a larger proportion of unsaturated nitrile and a smaller proportion of α-alkylstyrene are added to the reaction system.

7. The process according to claim 1, wherein during said introducing step a monomer mixture containing a larger proportion of α-alkylstyrene and a smaller proportion of unsaturated nitrile are continuously added to the reaction system and thereafter, with regulation of the concentration of unreacted unsaturated nitrile, a monomer mixture containing a larger proportion of unsaturated nitrile and a smaller proportion of α-alkylstyrene are added to the reaction system.

8. The process according to claim 1, wherein during said introducing step a monomer mixture containing a larger proportion of α-alkylstyrene and a smaller proportion of unsaturated nitrile are added to the reaction system and thereafter, with regulation of the concentration of unreacted unsaturated nitrile, unsaturated nitrile is added to the reaction system.

9. The process according to claim 1, wherein said α-alkylstyrene is selected from the group consisting of α-methylstyrene, α-ethylstyrene and methyl-α-methylstyrene.

10. The process according to claim 1, wherein said unsaturated nitrile is selected from the group consisting of acrylonitrile, methacrylonitrile and ethacrylonitrile.

11. The process according to claim 1, wherein said α-alkylstyrene is selected from the group consisting of α-methylstyrene, α-ethylstyrene and methyl-α-methylstyrene and wherein said unsaturated nitrile is selected from the group consisting of acrylonitrile, methacrylonitrile and ethacrylonitrile.

12. The process according to claim 1, wherein said α-alkylstyrene is α-methylstyrene.

13. The process according to claim 1, wherein said unsaturated nitrile is acrylonitrile.

14. The process according to claim 1, wherein said α-alkylstyrene is α-methylstyrene and said unsaturated nitrile is acrylonitrile.

15. A process for the production of a copolymer of an α-alkylstyrene and an unsaturated nitrile, consisting essentially of:
   introducing α-alkylstyrene monomers and unsaturated nitrile monomers in a reaction system in a weight ratio of 70:30 to 80:20, respectively, and copolymerizing said introduced monomers in the presence of a radical initiator in such a manner that the concentration of unreacted unsaturated nitrile in the reaction system is not less than 31% by weight of the entire amount of unreacted monomers in the reaction system at the completion of introducing the monomers into the system; and
   after the completion of introducing the monomers into the reaction system, further polymerizing the monomers to produce a copolymer comprising α-alkylstyrene and unsaturated nitrile monomers in a weight ratio of 70:30 to 80:20, wherein the produced copolymer has excellent thermal resistance and has 1% by weight or less of unreacted monomers at completion of polymerization.

16. The process according to claim 15, wherein polymerization is effected in such a manner that 90% by weight or more of the particles of the produced copolymer have a particle size of 0.10μ or less.

17. The process according to claim 15, wherein said α-alkylstyrene is α-methylstyrene.

18. The process according to claim 15, wherein said unsaturated nitrile is acrylonitrile.

19. The process according to claim 15, wherein said α-alkylstyrene is α-methylstyrene and said unsaturated nitrile is acrylonitrile.

* * * * *